Oct. 26, 1937. G. W. BOWEN 2,097,016
LINE WIPER
Filed April 22, 1935
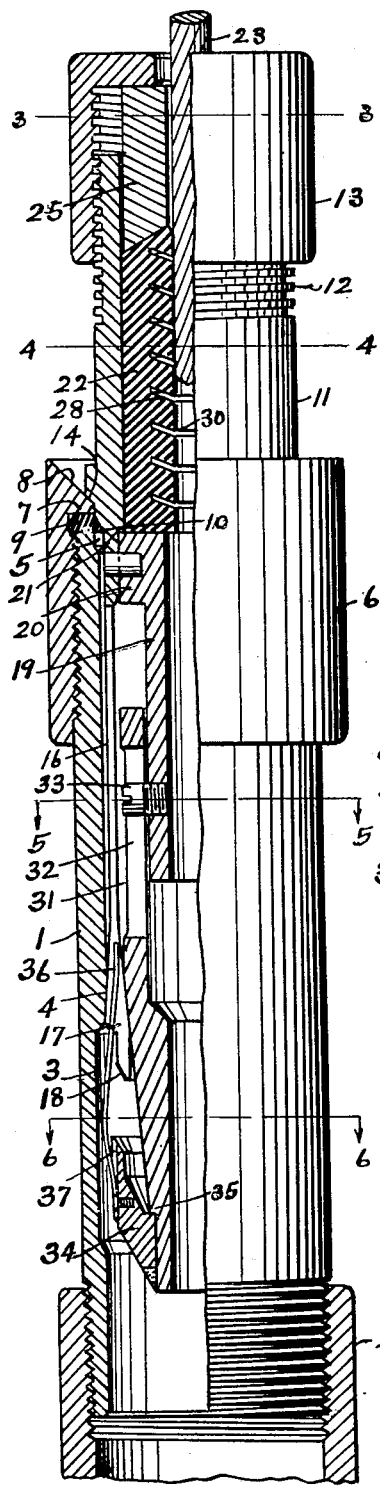
Fig. 1.
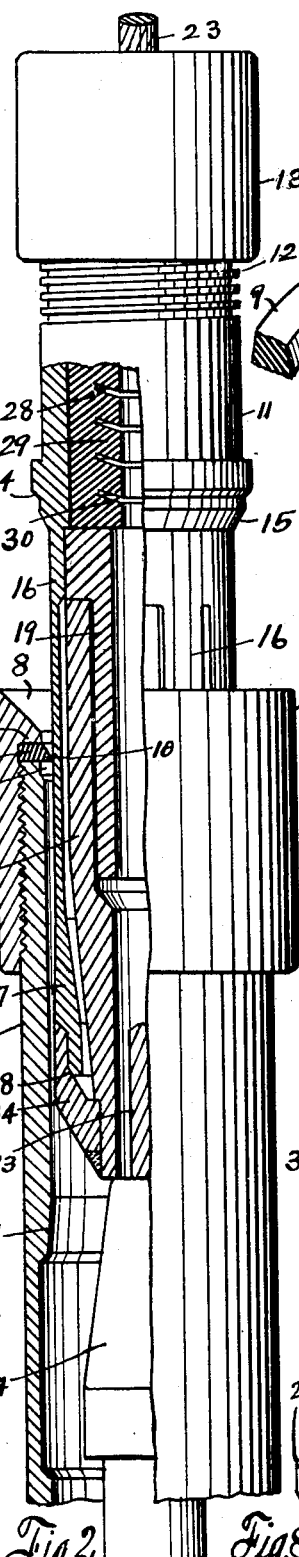
Fig. 2.
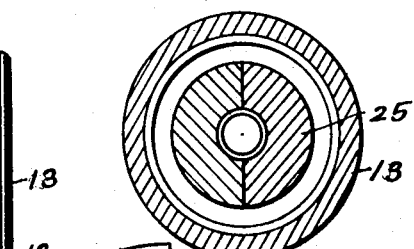
Fig. 3.
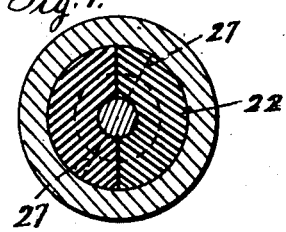
Fig. 7.
Fig. 4.
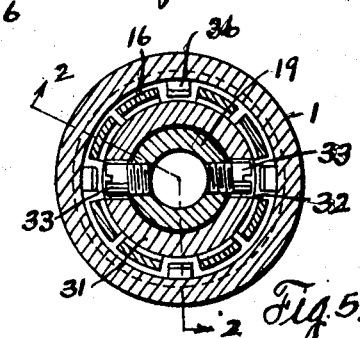
Fig. 5.
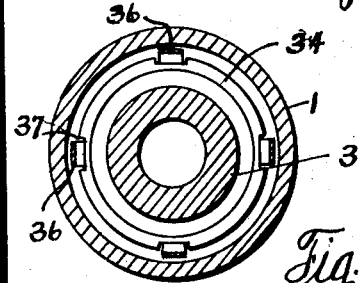
Fig. 6.
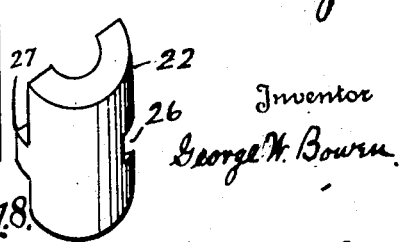
Fig. 8.
Inventor
George W. Bowen
By
Hardway Cathey
Attorneys Patented Oct. 26, 1937

2,097,016

UNITED STATES PATENT OFFICE 2,097,016

LINE WIPER

George W. Bowen, Houston, Tex.

Application April 22, 1935, Serial No. 17,690

13 Claims. (Cl. 166—14)

This invention relates to a line wiper.

An object of the invention is to provide a line wiper adapted to be connected onto a Christmas tree or other flow line of a well, and which is designed to wipe the line to which a swab or other implement in the well is connected.

Another object of the invention is to provide a wiper whereby the line or rod used for manipulating a swab or other appliance in the well will be wiped so that the line or rod will be kept clean and the slush, oil, or other foreign matter will be wiped from the line and returned back into the well to save the oil, and to prevent the oil, slush, and the like from reaching the derrick floor and from eventually reaching and polluting adjacent streams of water in the vicinity of the well.

A further object is to provide a line wiper that may be readily seated within the surrounding shell or housing and secured therein, and which, when in active position, will efficiently wipe the line or rod, but which may be automatically released by the line socket when it is desired to withdraw the swab or other implement from the well.

A still further object is to provide a line wiper which will be securely mounted in active position during ordinary operation of the line therethrough, which cannot be displaced by the well pressure, but which will be readily released upon impact of the line socket therewith so as to prevent injury thereto, or breakage of the line in case of a sudden or inadvertent impact of the socket against the lower end thereof.

A still further feature of the invention resides in a novel type of packing so designed as to provide an efficient low pressure seal, but the sealing effect of which will increase as the well pressure increases.

It is a further object of this invention to provide a line wiper which will quickly and automatically provide a seal at the top of the well immediately upon lowering the swab or other apparatus into the well, thus minimizing the escape of gas and lessening the fire hazard.

It is another object of the invention to provide a line wiper which is of very simple, yet durable construction; it is composed of comparatively few parts and is not liable to become disabled or to get out of repair.

With the above and other objects in view, the invention has particular relation to certain novel features of construction, operation, and arrangement of parts, an example of which is given in this specification and illustrated in the accompanying drawing, wherein:

Figure 1 shows a side view of the apparatus, partly in section, and connected to the upper end of a Christmas tree, or other well connection.

Figure 2 shows a fragmentary side elevation, partly in section, taken on the line 2—2 of Figure 5.

Figure 3 shows a cross-sectional view taken on the line 3—3 of Figure 1.

Figure 4 shows a cross-sectional view taken on the line 4—4 of Figure 1.

Figure 5 shows a cross-sectional view taken on the line 5—5 of Figure 1.

Figure 6 shows a cross-sectional view taken on the line 6—6 of Figure 1.

Figure 7 shows a fragmentary perspective view of a type of packing ring that may be employed, and Figure 8 shows a perspective view of one section of the line-packing sleeve employed.

Referring now more particularly to the drawing wherein like numerals of reference designate the same parts in each of the figures, the numeral 1 designates an outer shell or housing, tubular in form, and adapted to be connected to the upper end of a Christmas tree 2, or other tubular connection.

Adjacent its lower end the housing 1 is internally and annularly recessed, as at 3 and above said recessed portion, is slightly tapered upwardly forming the upwardly converging annular face 4. At its upper end the housing is internally countersunk, thus forming the recess 5 and is externally threaded to receive the tubular head 6. The upper end of this head is inwardly thickened forming the downwardly facing annular inside shoulder 7, and above said shoulder is outwardly and upwardly tapered forming the annular tapered seat 8.

Clamped between the shoulder 7 and the upper end of the housing 1, there is a packing ring 9 whose inner margin is downwardly and inwardly tapered terminating in the annular lip 10 which overhangs the recess 5.

The numeral 11 designates a tubular packing retainer which forms, also, a slip support. This retainer is provided at its upper end with the external coarse threads 12 designed to receive a clamp cap 13. The packing retainer has an external downwardly tapering face 14 thereon, and beneath the face 14, also has the annular downwardly tapering face 15, said faces 14 and 15 being provided to seat against the seat 8 and the inner margin of the packing 9, respectively, when the apparatus is assembled and in active position. Depending from the packing retainer 11, are the flexible arms 16 which are preferably formed integrally with said retainer and on the lower ends of these arms are the upwardly tapering slip wedges 17. The lower ends of these slip wedges are inwardly reduced in thickness and terminate with the downwardly and inwardly tapering faces 18, as indicated in Figures 1 and 2. The numeral 19 designates the tubular inner mandrel which depends from the packing retainer 11 and whose upper end is outwardly thickened, as at 20, and fitted into and secured to the lower end of the packing retainer 11. The upper end of this inner mandrel abuts an inside annular shoulder 21 in the packing retainer.

There is a sleeve-like packing 22 fitted within the retainer 11 and shaped to fit closely around the line 23. The lower end of this line is attached to the conventional socket 24 from which the swab, or other apparatus to be operated in the well, depends.

A gland 25 is fitted within the upper end of the retainer 11 and around the line 23, and its lower end bears against the upper end of the packing 22. The clamp cap 13 engages the gland 25 and the pressure of the gland against the packing 22 may be readily regulated by an appropriate manipulation of the clamp cap 13. The packing 22 is preferably split longitudinally and thus formed into sections, and the gland 25 is preferably similarly formed into sections for the convenient assembly of these parts. Each section of the packing 22 may be formed at one margin with the mortise 26 and at its other margin with the tenon 27 so that when the sections are assembled into a complete packing sleeve, the tenon of each section will fit into the mortise of the other section so as to break the joints between the sections to prevent leakage. The compression on the packing 22 should be so adjusted as to cause the packing to fit closely about the line 23 so as to prevent the escape of the pressure fluid as well as to cause the packing to effectively wipe the line upon upward movement of the line through the packing. This packing has the inside annular slits 28 spaced apart from the upper to the lower ends thereof. These slits decline inwardly, thus forming the declining annular lips 29 between them, the inner lower margins of the lips terminating in annular edges 30. It will be obvious that upon downward movement of the line 23, the inner, or free margins, of the lips will recede slightly from the line so as not to unduly grip the same and the frictional wear on the lips will thus be relieved, but upon upward movement of the line through the packing, the inner margins of the lips will be caused, by friction, to move upwardly and inwardly, thus very closely surrounding and gripping the line and effectively wiping the oil, slush, and other material, adhering to the line, therefrom. The lip 10 of the packing 9 will be held in close contact with the opposing face 15 by the pressure of the fluid in the recess 5 so as to effectively prevent the escape of fluid through the joint between said packing and the retainer 11. The packing ring 9 may be a continuous ring or a split ring with its adjacent ends overlapping, as shown in Figure 7.

Slidably fitted over the reduced lower end of the inner mandrel 19 is the outer mandrel 31. This outer mandrel has the vertical slots 32 therein and screwed into the inner mandrel are the guides 33 whose heads project into the slots 32 and maintain the outer and inner mandrels assembled and prevent the relative turning of said mandrels. The outer mandrel 31 is downwardly tapered, externally, beneath said slots forming an expander, and secured onto its lower end is the ferrule 34 whose upper end is outwardly tapered and spaced from said expander. The ferrule abuts the external annular shoulder 35 on the expander and is preferably welded to said expander. There are the outwardly curved flat springs 36 whose lower ends are fastened in the external vertical grooves 37 of the ferrule and whose upper ends are free.

In use the inner assembly comprising the packing retainer 11 and the appendants thereof are assembled about the line 23 in the following manner:—

The inner and outer mandrels 19, 31, with the ferrule 34 and springs 36 attached to the latter, are assembled in and secured to said packing retainer and the line without the socket 24, is passed downwardly through said assembly and the socket is then babbitted, or otherwise secured to the line. The packing 22, gland 25, and the clamp cap 13, and the latter having been previously threaded onto the line, are then inserted and secured into place. The swab or other apparatus to be lowered into the well is then connected to the socket and is lowered into the well with the lower end of the inner assembly resting on said socket and with the springs 36 frictionally engaged against the inside walls of the housing 1 which has previously been connected to the Christmas tree, or to the connection 2, all as shown in Figures 2 and 5. When so assembled and let down into the well, the ferrule 34 is engaged about the reduced lower ends of the slip wedges 17 whereby said wedges are held retracted.

When the springs 36 reach the annular recess 3, they will spring outwardly, thus releasing the ferrule 34 and the outer mandrel and ferrule 34 will then drop by gravity, and the slip wedges 17 will be released by the ferrule and will spring outwardly. Meanwhile, the packing retainer 11 will have moved into position to seat the faces 14 and 15 closely against the seat 8 and the packing 9 respectively. In this position the outer faces of the slip wedges will rest against the upwardly converging face or seat 4 of the housing 1, and the downwardly tapering portion or expander of the outer mandrel 31 will wedge in between the slip wedges 17 fitting closely against the inside tapering faces of said wedges, thus securely anchoring the wedges as well as the packing retainer securely and immovably in place, all as shown in Figure 1.

The line operations may then be carried on without danger of leakage past either of the packings, and upon upward movement of the line 23, it will be wiped clean.

When it is desired to withdraw the swab or other implement from the well, it may be elevated to bring the socket 24 into contact with the lower end of the outer mandrel 31, and further elevated to carry said outer mandrel upwardly; thereupon the expander portion of the outer mandrel will relieve the slip wedges, the outwardly flared ferrule will engage over the lower ends of the slip wedges and retract the wedges and the inner assembly of the wiper apparatus will then be carried on up with the line out of the housing 1.

In case the line should be rapidly elevated and the socket 24 carried into sudden impact against the lower end of the inner assembly, said assembly will not be liable to be injured, or the line broken, for the reason that the assembly will be released from the housing and carried upwardly, as hereinabove explained.

Upon withdrawal of the swab, or other tool from the well, the housing 1 may be detached and the entire apparatus laid aside for further use.

The drawing and description disclose what is now considered to be a preferred form of the invention by way of illustration only, while the broad principle of the invention will be defined by the appended claims.

What I claim is:—

1. A line wiper comprising a tubular housing, an inner assembly associated with the housing including a packing retainer, slip wedges arranged to depend from the retainer into the housing, means arranged to retain the slip wedges retracted and movable into position to release said slip wedges and to maintain them in secure engagement with the housing to anchor the packing retainer in place.

2. A line wiper comprising a tubular housing, an inner assembly associated with the housing including a packing retainer, slip wedges arranged to depend from the retainer into the housing, means arranged to retain the slip wedges retracted and movable into position to release said slip wedges and to maintain them in secure engagement with the housing to anchor the packing retainer in place, and packing in the retainer shaped to closely surround a line extending axially through the wiper.

3. A line wiper comprising a tubular housing, a packing retainer thereon, a line packing in the retainer, a slip wedge depending from the retainer into the housing, means connected to the retainer and shaped to engage said slip wedge to maintain the wedge retracted, or inactive, said means being movable into position to release the wedge and to maintain it in active position in secure engagement with the housing to anchor the packing retainer in place.

4. A line wiper comprising a tubular housing, a packing retainer thereon, a line packing in the retainer, a slip wedge depending from the retainer into the housing, means connected to the retainer and shaped to engage said slip wedge to maintain the wedge retracted, or inactive, said means being movable into position to release the wedge and to maintain it in active position in secure engagement with the housing to anchor the packing retainer in place, and packing forming a leak-proof joint around the retainer and between said retainer and housing.

5. A line wiper comprising a tubular housing, a packing retainer thereon, packing in the retainer shaped to surround a wire line, an anchor depending from the retainer into the housing, an expander having connection with the packing retainer, means on the expander arranged to retain the anchor in retracted, or inactive, position, said expander being movable to effect the release of the anchor and to maintain the anchor, when so released, in secure engagement with the housing to maintain the packing retainer in place on the housing.

6. A wiper of the character described comprising an outer housing adapted to be connected to a flow line in a well, and an inner assembly, said inner assembly including a packing retainer, a sleeve-like packing in the retainer, anchoring means connected to the retainer and adapted to be inserted into the housing, said anchoring means having a slip wedge and controlling means movable into one position to hold the wedge retracted into inactive position, and into another position to release said wedge and to maintain the wedge in active position in gripping relation with the housing whereby the packing retainer and packing are anchored on the housing.

7. A wiper of the character described comprising an outer housing adapted to be connected to a flow line in a well and an inner assembly, said inner assembly including a packing retainer, a sleeve-like packing in the retainer, anchoring means connected to the retainer and adapted to be inserted into the housing, said anchoring means having a slip wedge and controlling means movable into one position to hold the wedge retracted into inactive position, and into another position to release said wedge and to maintain the wedge in active position in gripping relation with the housing whereby the packing retainer and packing are anchored on the housing, and means for forming a fluid-tight joint between the housing and inner assembly.

8. A wiper of the character described comprising an outer housing adapted to be connected to the top of a pipe in a well, a packing retainer on the housing, line packing in the retainer, anchoring means connected to the retainer and insertable into the housing and including anchoring wedges and means movable into one position to maintain the wedges retracted and into another position to release the wedges and to expand and anchor them in gripping relation with the housing whereby the packing retainer and packing will be anchored on the housing.

9. A line wiper comprising a housing, a packing retainer on the housing, a line packer in the retainer, anchoring means having connection with the retainer and insertable into the housing, said anchoring means including gripping members flexibly connected to the packing retainer, an expanding mandrel having a retainer thereon and movable into one position into engagement with the gripping members to retain said gripping members in retracted or inactive position, and movable into another position to effect the release of the gripping members to permit them to move outwardly into gripping relation with the housing, said mandrel, when in said last mentioned position, being effective to maintain the gripping members in secure gripping relation with the housing to anchor the packing retainer and packing on the housing.

10. A line wiper comprising a housing, having its inside diameter enlarged to form an inside recess spaced from one end thereof, a packing retainer on the housing, a line packer in the retainer, anchoring means having connection with the retainer and insertable into the housing, said anchoring means including gripping members flexibly connected to the packing retainer, an expanding mandrel having a retainer thereon and movable into one position into engagement with the gripping members to retain said gripping members in retracted or inactive position, and movable into another position to effect the release of the gripping members to permit them to move outwardly into gripping relation with the housing, said mandrel, when in said last mentioned position, being effective to maintain the gripping members in secure gripping relation with the housing to anchor the packing retainer and packing on the housing, flexible friction members connected to said mandrel and arranged to frictionally engage the inside of the housing upon insertion of the anchoring means into the housing to maintain the retainer on said mandrel in engagement with said gripping members, said friction members being arranged to enter said recess and to thereupon release their said frictional engagement with the housing to permit the expanding mandrel to move into said last-mentioned, or active, position.

11. A line wiper comprising a tubular housing, a packing retainer on the housing, line packing in the retainer, a slip wedge connected to the retainer and depending into the housing, means normally held by gravity in position to maintain the wedge in engaging relation with the housing to anchor the retainer in its lowermost position and said means being movable into another position to permit the release of the slip wedge from the housing.

12. A line wiper comprising a housing, a packing retainer on the housing, line packing in the retainer, a slip wedge connected to the retainer and depending into the housing, means normally held by gravity in position to maintain the wedge in engaging relation with the housing to anchor the retainer against upward movement, the contacting parts of said means and said wedge being shaped to allow said means to gradually descend to take up wear between said parts whereby the wedge and retainer are held against upward movement relative to the housing, said means being capable of movement to another position to permit the release of the slip wedge from the housing.

13. A line wiper comprising a housing, a packing retainer on the housing, line packing in the retainer, a slip wedge connected to the retainer and depending into the housing, a mandrel whose external surface tapers downwardly and co-acts with the slip wedge to maintain the wedge in engaging relation with the housing to anchor the retainer against upward movement, said mandrel being subject to the influence of gravity whereby the mandrel may gradually move downwardly to take up wear between said parts and whereby the wedge and retainer are held against upward movement relative to the housing, said mandrel being also movable into position to permit release of the slip wedge from the housing.

GEORGE W. BOWEN.